United States Patent [19]

Perfetti

[11] Patent Number: 4,762,753

[45] Date of Patent: Aug. 9, 1988

[54] INSULATIVE COATING COMPOSITION

[75] Inventor: Bruno M. Perfetti, Westmoreland County, Pa.

[73] Assignee: USX Corporation, Pittsburgh, Pa.

[21] Appl. No.: 50,984

[22] Filed: Mar. 31, 1987

[51] Int. Cl.$^4$ .................... C04B 12/04; H01F 1/04
[52] U.S. Cl. .................... 428/450; 106/19; 106/84; 148/6.0; 148/113; 428/454
[58] Field of Search .................... 106/19, 84; 428/450, 428/454; 148/6.0, 113

[56] References Cited

U.S. PATENT DOCUMENTS

| | | | |
|---|---|---|---|
| 1,750,305 | 3/1930 | Gross | 106/84 |
| 1,924,311 | 1/1931 | Frey | 175/21 |
| 1,982,179 | 11/1934 | Scharschu | 154/43 |
| 2,739,085 | 3/1956 | McBride | 117/222 |
| 3,732,115 | 5/1973 | Lankard et al. | 106/84 |
| 3,804,650 | 4/1974 | Meissner et al. | 106/84 |
| 4,144,074 | 3/1979 | Itoh et al. | 106/14.17 |
| 4,533,573 | 8/1985 | Perfetti | 427/287 |

*Primary Examiner*—Steven Capella
*Attorney, Agent, or Firm*—William F. Riesmeyer, III

[57] ABSTRACT

A coating composition is disclosed consisting essentially of sodium silicate, magnesium oxide or magnesium hydroxide, titanium oxide and mica. Coatings from this composition are useful as electrically insulating coatings, particularly as applied to electrical steel sheets for magnetic cores, or to other metal products or substrates. The coating may be cured at temperatures within the range of 400° to 500° F. and provides reduced die wear of electrical steel sheet during punching operations. It also is tightly adherent and retains excellent electrical insulating properties after annealing at temperatures within the range of 1350° to 1550° F.

12 Claims, No Drawings

INSULATIVE COATING COMPOSITION

BACKGROUND OF THE INVENTION

This invention relates to a coating composition which has excellent electrical insulating properties, which can be cured at lower than normal temperatures, and which provides reduced die wear in punching operations, e.g. of electrical steel sheet having such a coating thereon.

Two principal types of coatings are currently used for insulation of electrical steel sheet product, namely, those based on aluminum phosphate and certain silicate resin compositions. The phosphate systems have a tendency to become powdery during punching operations in low temperature, low humidity environments and to absorb moisture and become sticky at higher temperatures in high humidity environments. The silicate-resin systems are less corrosion resistant and several times more expensive than the phosphate systems. Thus, both systems have significant disadvantages and a coating overcoming these disadvantages is needed.

An insulating coating for electrical sheet containing sodium silicate, carbohydrate (such as sugar) and various insulating or filler materials such as talc, silica, clays, mica, magnesia mica, and insulating oxides such as aluminum oxide, iron oxide and magnesium oxide is disclosed in U.S. Pat. No. 1,750,305. Also, this coating is baked at temperatures of 120° to 150° C. A coating for the same purpose containing about 45% aluminum oxide and 15% sodium silicate is disclosed in U.S. Pat. No. 1,924,311. This reference also discloses that iron or calcium oxide, or highly calcined or fused magnesium oxide, or a mixture of two or more of such substances may be substituted for all or a portion of the aluminum oxide. The use of borax or borates as a binding agent is also disclosed. Another coating for electrical sheet is disclosed in U.S. Pat. No. 1,982,179. This coating contains lime, iron oxide and water glass. The reference also suggests that magnesium oxide may be substituted for the lime or both may be used. Finally, an insulative coating containing magnesium oxide and 2 to 5% bentonite (defined as a natural colloidal crystalline inorganic hydrous aluminum silicate) for electrical sheet is disclosed in U.S. Pat. No. 2,739,085.

It is a primary object of this invention to provide a coating which does not become powdery or sticky, has good corrosion resistance and electrical insulation properties before and after quality development annealing, can be cured at relatively low temperatures and provides reduced die wear during punching operations, e.g. of electrical steel sheet having the coating thereon.

SUMMARY OF THE INVENTION

According to this invention, a coating composition is provided consisting essentially of a solution or dispersion in an aqueous medium of 4 to 16 percent by weight of solids containing 20/30 percent sodium silicate, 16/25 percent magnesium oxide derived from a component selected from the group consisting of magnesium oxide, magnesium hydroxide and mixtures thereof, 6/15 percent titanium oxide and 18/42 percent mica, the ratio of mica to titanium oxide being within the range of 2.0 to 6.5. Preferably, the coating further includes 3 to 14 percent kaolin and 1 to 6 percent alkali metal borate. The invention also includes electrical steel sheet having the aforementioned coating thereon and magnetic cores made from laminations of said coated electrical steel sheet. A significant advantage of the invention is reduced die wear during punching operations of electrical steel sheet having such a coating thereon due to the presence of titanium oxide within the ranged claimed in said coating composition.

It is essential that sodium silicate be used in the composition of this invention instead of other soluble alkali silicates such as potassium silicate and ammonium silicate. The latter soluble silicates do not perform adequately as vehicles for coatings applied from the composition of this invention. Sodium silicate in the forms commercially available may be used. Preferably, a mixture of two such commercially available solutions are mixed together in order to obtain an $SiO_2$ to $Na_2O$ ratio within the range of 2.4 to 3.2 and provide better adherence of the coating. Similarly, sodium silicate contents below 24 percent do not provide coatings having adequate adherence whereas the presence of sodium silicate in excess of 38 percent does not provide adequate insulation properties. The magnesium oxide may be derived from a component containing magnesium oxide, magnesium hyroxide or mixtures of them. Preferably, magnesium hydroxide is used in order to provide good package stability and reduce gelation of the composition. Magnesium oxide contents below 18 percent do not provide adequate coating adherence whereas magnesium oxide contents greater than 28 percent also decrease resistivity and give poor electrical insulation properties.

It is essential that titanium oxide be used in the composition of this invention as distinguished from other refractory oxides, such as aluminum oxide, chromium oxide and zirconium oxide, in order to provide reduced die wear of electrical steel sheet product during punching operations. The use of titanium oxide has the additional advantage of providing opacity to the coating from which the thickness of coatings applied may be estimated by visual observation. Titanium oxide contents below 7 percent and greater than 19 percent decrease adherence of the coating. It is preferred that the titanium oxide be simple $TiO_2$ as distinguished from other complex oxides such as $SrTiO_3$, $BaTiO_3$, $Mg_2TiO_4$ or $CaTiO_3$.

Finally, it is essential that mica be used in the composition of this invention as distinguished from certain other similar minerals such as talc without destroying the adherence of the coating. Similarly, mica contents below 22 percent and greater than 53 percent seriously reduce adherence of the coating. The ratio of mica to titanium oxide should be within the range of 2.0 to 6.5 in order to obtain adequate electrical insulation properties. Preferably, this ratio should be within the range of 2.5 to 3.5 to provide the best electrical insulation on electrical steel sheets after exposure to quality development annealing at 1500° F.

Additional components which may be employed are kaolin within the range of 3 to 14 percent, preferably 4 to 8 percent and alkali metal borate within the range of 1 to 6 percent. Kaolin acts as a thickener and enhances package stability of the composition. The presence of kaolin makes it easier to achieve proper coating thicknesses whereas thin coatings may result without kaolin in the coating. Alkali metal borates also act as thickeners and improve coatability. In addition, they add additional heat resistance to the coating and improved performance of the coating after quality development annealing of electrical steel sheet product. Preferably, sodium tetraborate and sodium metaborate are used in varied amounts to provide equivalent $B_2O_3$ contents. The coating may be applied by various conventional means. A significant advantage over other prior compositions is that the coating may be cured at temperatures within the range of 400° to 500° F. which is lower than normal.

As an example of the composition of this invention, an aqueous dispersion or solution was prepared by mixing the following ingredients:

| Component | Weight Parts/100 |
|---|---|
| Soluble sodium silicate solution | |
| (A) $SiO_2$ to $Na_2O$ ratio 3.85 | 13.6 |
| (B) $SiO_2$ to $Na_2O$ ratio 2.00 | 9.9 |
| Magnesium hydroxide | 9.3 |
| Borax (sodium tetraborate) | 1.0 |
| Kaolin | 2.8 |
| Titanium oxide ($TiO_2$) | 2.8 |
| Mica | 9.1 |
| Water | 51.5 |

The resultant composition had the following calculated percentages of chemical components as percent by weight of total solids.

| | |
|---|---|
| $SiO_2.Na_2O$ | 25.8 |
| Magnesium hydroxide | 27.6* |
| Borax | 3.0 |
| Kaolin | 8.3 |
| Titanium Oxide | 8.3 |
| Mica | 27.0 |

A coating of about 0.1 mil in thickness was applied from this composition to electrical sheet steel. The coating was dried for 10 minutes at 450° F. After subjecting the dried coated sheet to 100 inch pounds of reverse impact and testing with Scotch tape, the adherence of the coating was excellent with essentially no bare or thin spots appearing in the coating. A standard Franklin Restivity Test apparatus was then used to determine the electrical insulation value of the coating. When tested at 150° C. and 500 psi clamp pressure, a value of 0.12 amps was obtained. The coated sheet was then quality quality development annealed at 1550° F. for one hour. After annealing, the Franklin Test value was 0.13 amps indicating the coating has excellent electrical insulation characteristics after annealing.

The composition may be applied to other substrates for various purposes but has particular utility as an electrically insulative coating for application to electrical steel sheet product. Magnetic cores may be made from laminations of the coated electrical steel sheet product for use in transformers, motors or generators.

I claim:

1. A composition for coating substrates, said composition consisting essentially of:
    a solution or dispersion in an aqueous medium of 4 to 16 percent by weight of solids containing as a percent by weight of total solids, 24 to 38 percent sodium silicate, 18 to 28 percent magnesium oxide derived from a component selected from the group consisting of magnesium oxide, magnesium hydroxide and mixtures thereof, 7 to 19 percent titanium oxide, 22 to 53 percent mica, the weight ratio of mica to titanium oxide being within the range of 2.0 to 6.5.

2. The coating composition of claim 1 further including 3 to 14 percent kaolin.

3. The coating composition of claim 1 further including 1 to 6 percent alkali metal borate.

4. The coating composition of claim 1 wherein the ratio of $SiO_2$ to $Na_2O$ in said sodium silicate is within the range of 2.4 to 3.2.

5. The coating composition of claim 1 wherein the component from which said magnesium oxide is derived is magnesium hydroxide.

6. The coating composition of claim 1 further including 3 to 14 percent kaolin and 1 to 6 percent alkali metal borate and wherein the weight ratio of mica to titanium oxide is within the range of 2.5 to 3.5.

7. The coating composition of claim 6 wherein the component from which said magnesium oxide is derived is magnesium hydroxide.

8. The coating composition of claim 7 wherein said sodium silicate is within the range of 28 to 37 percent, said magnesium hydroxide is present in sufficient amount to provide 21 to 26 magnesium oxide, said titanium oxide is within the range of 10 to 13 percent, and said mica is within the range of 30 to 38 percent.

9. The coating composition of claim 8 wherein the ratio of $SiO_2$ to $Na_2O$ in said sodium silicate is within the range of 2.4 to 3.2.

10. The coating composition of claim 9 wherein the particle size of said solids is less than 325 mesh.

11. Electrical steel sheet having an insulating coating thereon formed from a composition consisting essentially of:
    a solution or dispersion in an aqueous medium of 4 to 16 percent by weight of solids containing as a percent by weight of total solids, 24 to 38 percent sodium silicate, 18 to 28 percent magnesium oxide derived from a component selected from the group consisting of magnesium oxide, magnesium hydroxide and mixtures thereof, 7 to 19 percent titanium oxide, 22 to 53 percent mica, the weight ratio of mica to titanium oxide being within the range of 2.0 to 6.5.

12. A magnetic core made from laminations of electrical steel sheet having an insulating coating thereon formed from a composition consisting essentially of:
    a solution or dispersion in an aqueous medium of 4 to 16 percent by weight of solids containing as a percent by weight of total solids, 24 to 38 percent sodium silicate, 18 to 28 percent magnesium oxide derived from a component selected from the group consisting of magnesium oxide, magnesium hydroxide and mixtures thereof, 7 to 19 percent titanium oxide, 22 to 53 percent mica, the weight ratio of mica to titanium oxide being within the range of 2.0 to 6.5.

* * * * *